United States Patent [19]

Fischer

[11] Patent Number: 5,704,578
[45] Date of Patent: Jan. 6, 1998

[54] FRONT-LOCKING SWIVEL BALL LOUDSPEAKER MOUNT

[75] Inventor: Roy K. Fischer, Scottsdale, Ariz.

[73] Assignee: JBL Incorporated, Northridge, Calif.

[21] Appl. No.: 552,718

[22] Filed: Nov. 3, 1995

[51] Int. Cl.[6] .................................................. A47F 5/00
[52] U.S. Cl. .................. 248/288.51; 248/221.11; 403/76; 403/122
[58] Field of Search .................. 248/288.51, 288.31, 248/222.14, 221.11, 222.13; 403/90, 114, 76, 122

[56] References Cited

U.S. PATENT DOCUMENTS

| | | | |
|---|---|---|---|
| 3,319,982 | 5/1967 | Schwartz | 403/90 |
| 3,783,547 | 1/1974 | Bystrom et al. | 403/90 X |
| 3,958,904 | 5/1976 | Rusbach | 403/90 |
| 4,049,230 | 9/1977 | Minniear | 248/222.14 X |
| 4,143,846 | 3/1979 | Rock et al. | 248/222.13 X |
| 4,765,580 | 8/1988 | Wright | 248/181.1 |
| 4,796,508 | 1/1989 | Hoshino | 248/288.51 X |
| 4,915,333 | 4/1990 | Bolondi | 248/288.51 X |
| 4,974,802 | 12/1990 | Hendren | 403/90 X |
| 4,984,278 | 1/1991 | Frye et al. | 248/179.1 X |
| 5,016,850 | 5/1991 | Plahn | 403/90 X |
| 5,544,968 | 8/1996 | Goellner | 403/90 X |

Primary Examiner—Alvin C. Chin-Shue
Assistant Examiner—Derek J. Berger
Attorney, Agent, or Firm—J. E. McTaggart

[57] ABSTRACT

For adjustably mounting an enclosure such as a loudspeaker to an architectural mass such as on a wall, a ball-and-socket swivel mounting mechanism is enclosed within a rear region of the enclosure, thus eliminating unsightly conventional external swivel-mounting apparatus. A mounting ball, at the end of a shaft cantilevered to the wall, enters the mounting mechanism through a circular opening in a central region of the rear panel of the enclosure. The ball is clamped between a fixed jaw and a movable jaw actuated by an adjusting screw via which the jaw-clamping force can be applied, adjusted and released by a tool inserted through an opening in the front of the enclosure and directed by an internal guide tube to engage the adjusting screw; thus all installation, orientation adjustment, clamping in place and removal of the enclosure can be performed conveniently from the front of the enclosure.

14 Claims, 5 Drawing Sheets

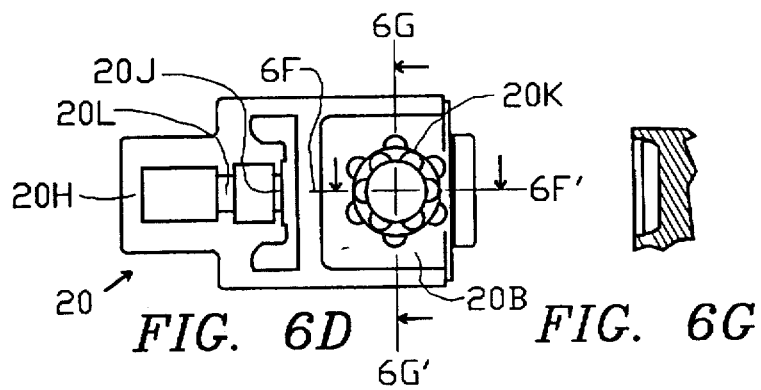
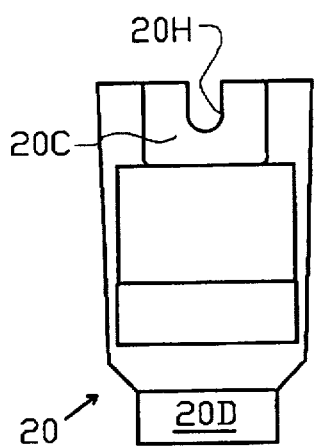
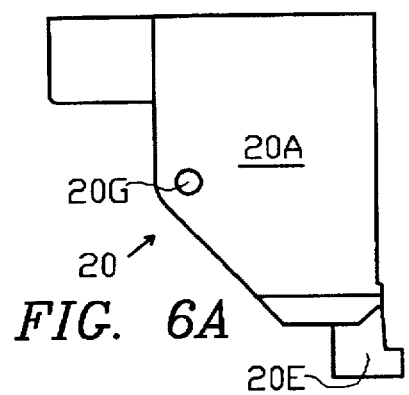
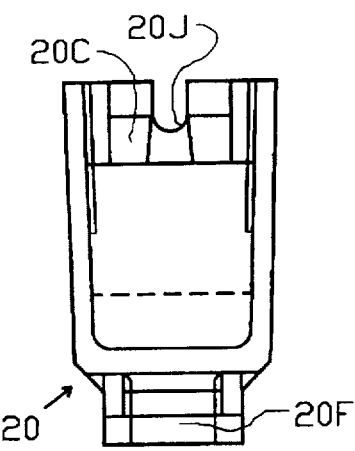
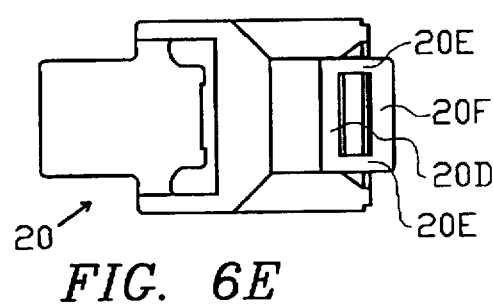

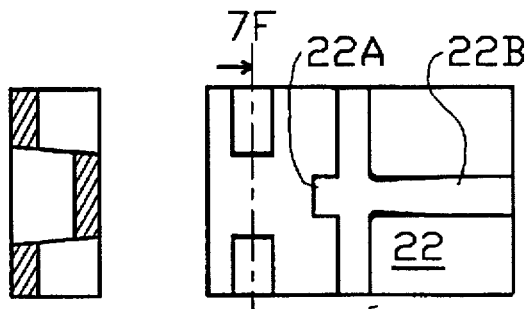
FIG. 7F    FIG. 7D
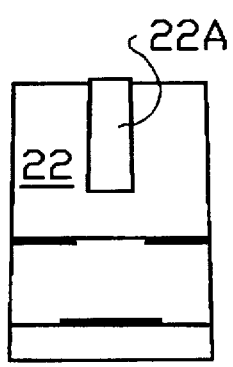 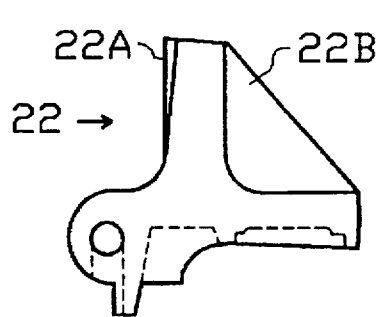 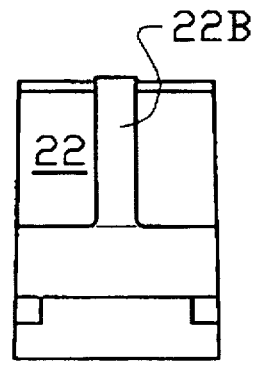
FIG. 7B    FIG. 7A    FIG. 7C
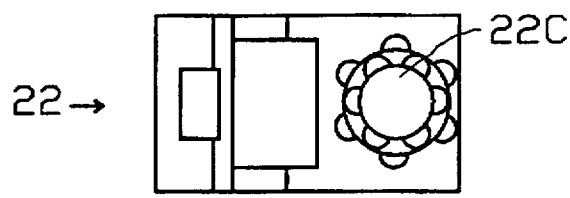
FIG. 7E

FRONT-LOCKING SWIVEL BALL LOUDSPEAKER MOUNT

FIELD OF THE INVENTION

The present invention relates to the field of adjustable mounting hardware for mounting and supporting an enclosure or other object from an architectural mass such as a wall, more particularly it relates to a ball swivel clamping mechanism, contained inside a rear region of an enclosure, typically a loudspeaker enclosure, that can be adjusted, locked and released from a convenient frontal location.

BACKGROUND OF THE INVENTION

There are many requirements for mounting an object such as an enclosed loudspeaker onto a wall in both residential and public locations. Generally the enclosure is rectangular and is simply fastened flat against the wall in a parallel relation. However, in many instances where such parallel or orthogonal orientation is unsatisfactory, swivel mountings have been utilized, typically attached onto the rear of the enclosure. Such structure has generally suffered the shortcoming that the required access to the mechanism at the rear of the enclosure for orientation adjustment, installation or removal is inconvenient.

DISCUSSION OF RELATED KNOWN ART

Ball-and-socket type mounting hardware of known art has been utilized in the general field of the present invention, however with regard to loudspeakers enclosures and the like, swivel mounting hardware of known art attached externally onto the rear of the enclosure has tended to be not only unsightly but inconvenient with regard to clamping in place due to the poor accessibility to clamping mechanism located at the rear of the supported enclosure.

U.S. Pat. No. 5,251,859 to Cyrell et al, assigned to Omnimount Systems, exemplifies a ball type adjustable support that can support an audio loudspeaker. Attached to the rear if the enclosure and extending rearwardly therefrom is a mechanism having a fixed clamp plate, co-operating with a removable jaw plate to engage a ball attached by a rod to building structure. Such structure is unsightly due to the bulk of the clamp plate and jaw plate protruding to the rear; also it is inconvenient to clamp and/or release the ball for speaker orientation since this must be performed in an inaccessible and often "blind" region behind the speaker enclosure.

In view of known art of swivel enclosure mounting, there is an unfullfilled need for improvements that provide better appearance and more convenient adjustment of orientation and clamping in the selected orientation; more particularly such adjustment should be concealed within the enclosure and made available from a frontal region thereof.

OBJECTS OF THE INVENTION

It is a primary object of the present invention to provide, for mounting an enclosure such as a loudspeaker enclosure to a wall or other architectural mass, an adjustable swivel socket mechanism that is enclosed within the enclosure for mating with a swivel mounting ball on a cantilever shaft, typically secured to a wall by a mounting flange.

It is a further and equally important object that the enclosure and the swivel mechanism be constructed and arranged to be easily installed, oriented, locked in place, released and removed from a working location to the front of the enclosure.

SUMMARY OF THE INVENTION

The abovementioned objects have been accomplished by the present invention of a ball-and-socket type mounting mechanism, contained within the enclosure, having a fixed jaw and a movable jaw that can be adjusted through an opening in the front of the enclosure.

BRIEF DESCRIPTION OF THE DRAWINGS

The above and further objects, features and advantages of the present invention will be more fully understood from the following description taken with the accompanying drawings in which:

FIGS. 6A–E are the following views of the ball socket mechanism housing of FIGS. 3–5: elevational side, front, rear, top and bottom, respectively.

FIGS. 6F and 6G are cross-sectional views of the ball socket mechanism housing of FIGS. 3–5 taken through axis 6F and 6F' of FIG. 6D respectively.

FIGS. 7A–7E are the following views of the movable jaw part of the ball socket mechanism of FIGS. 3–6: elevational side, front, rear, top and bottom, respectively.

FIG. 7E is a cross-sectional view of the movable jaw part of the ball socket mechanism of FIGS. 3–6 taken through axis 7F of FIG. 7D.

DETAILED DESCRIPTION

Figure 1:
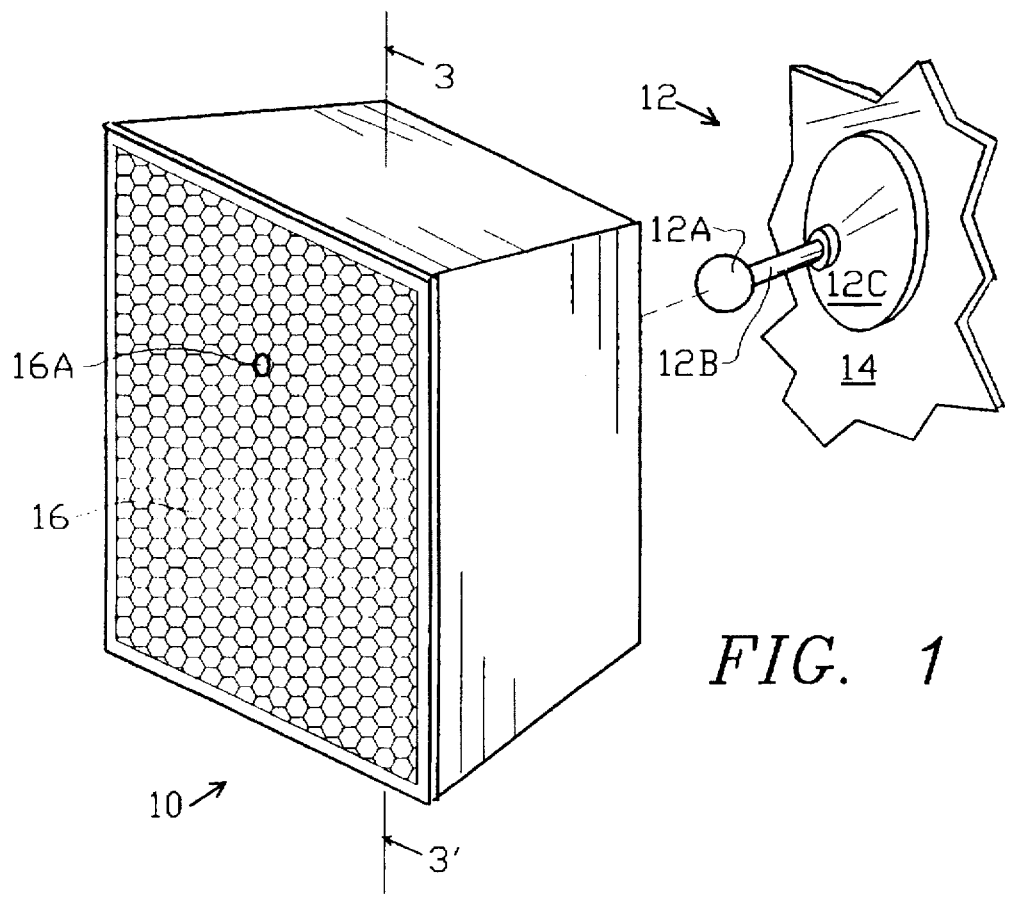
FIG. 1 is a three-dimensional view of a loudspeaker enclosure shown separated from a wall-mounted ball portion of a ball-and-socket mounting assembly, as seen from a forward viewpoint, indicating front-panel adjustment access in accordance with the present invention.

FIG. 1 is a three-dimensional view of a loudspeaker enclosure 10 utilizing a ball-and-socket swivel-mount of the present invention. The enclosure 10 is shown separated from a ball portion 12 of the mount having a ball 12A at the end of a mounting arm 12B, typically a round shaft or tube mounted in cantilever fashion by a flange 12C to a wall 14, shown in part. The front of the enclosure 10 is covered by a grille 16 which is provided with an access aperture 16A through which a tool can be inserted to manipulate the enclosed swivel-mount socket mechanism.

Figure 2:
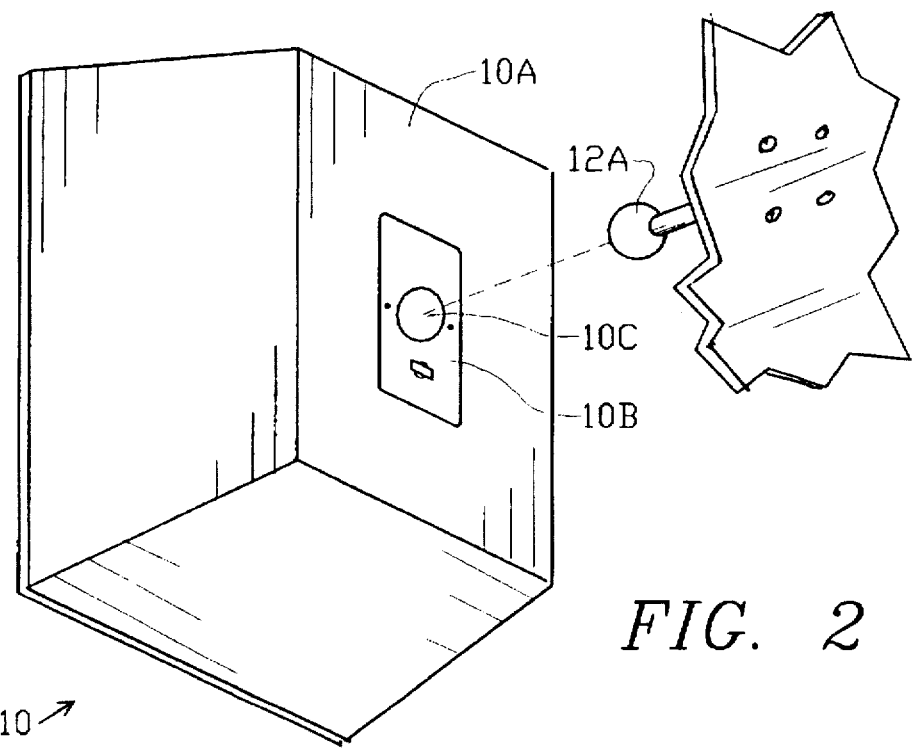
FIG. 2 depicts the subject matter of FIG. 1 as seen from a rearward viewsoint showing the absence of any external mounting mechanism, in accordance with the present invention.

FIG. 2 is a three-dimensional view of the subject matter of FIG. 1 as seen from a viewpoint located to the rear of the enclosure 10 and wall 14, revealing, as part of the rear panel 10A, a generally rectangular enclosure plate 10B mounted centrally and defining a circular ball opening 10C for entry of ball 12A.

Figure 3:
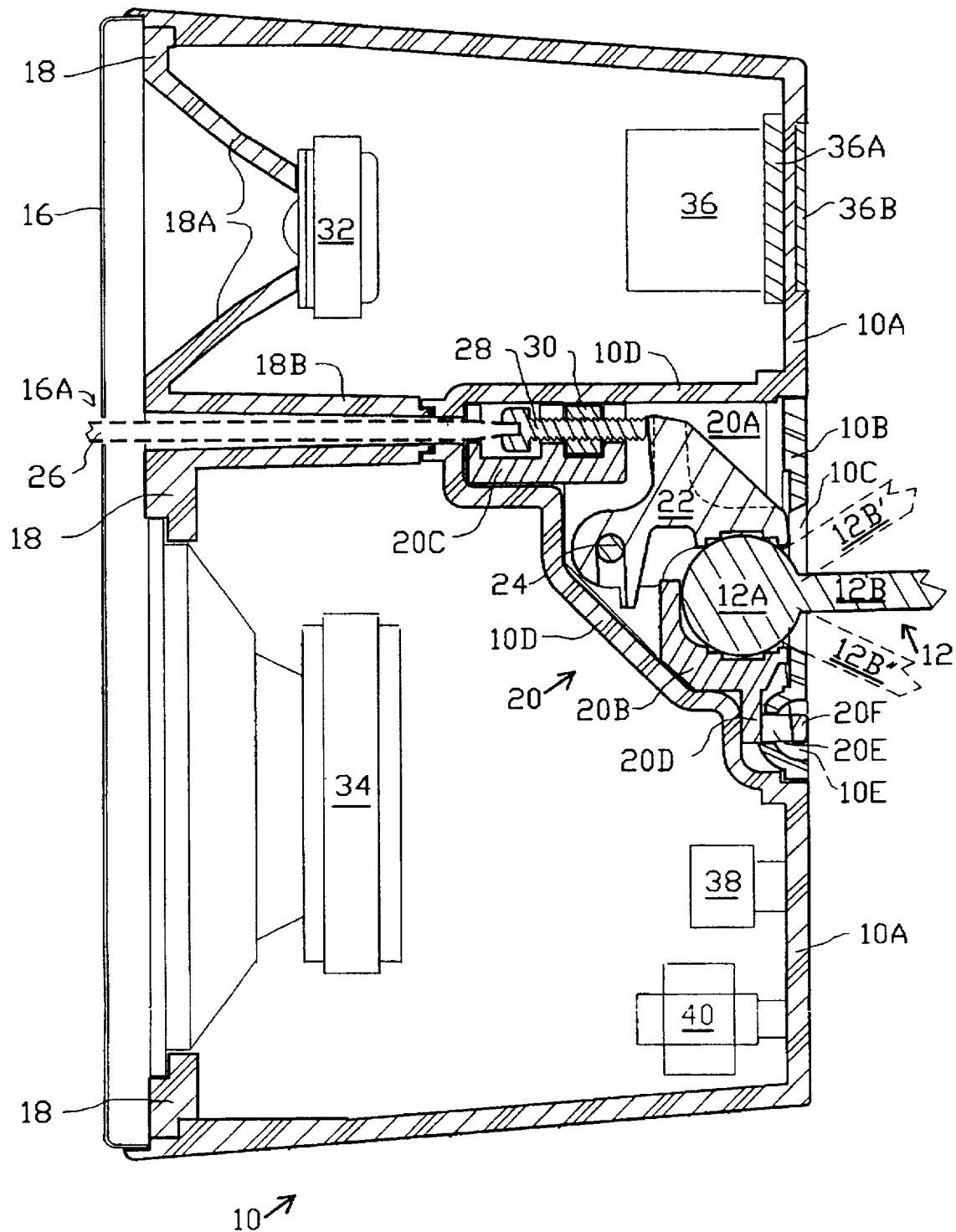
FIG. 3 is a cross-sectional side view of the loudspeaker enclosure of FIG. 1 taken through central axis 3–3', showing the ball clamped in place in a socket mechanism of the present invention located within the enclosure.

FIG. 3 is a cross-sectional side view of the loudspeaker enclosure 10 taken through axis 3–3' of FIG. 1. Ball 12A, which may be formed integrally with shaft 12B as shown, has entered the enclosure 10 through ball opening 10C of enclosure plate 10B and has entered a socket mechanism assembled in a housing frame 20 configured with two side plates 20A spaced apart by two integrally-joined crossmembers: a fixed jaw 20B at the bottom rear and an adjustment screw block 20C at the top front. Ball 12A is clamped in place between fixed jaw 20B and a movable jaw part 22 which is a separate part pivoted on a pin 24 and thus retained in housing frame 20.

Rear panel 10A of the main enclosure body is formed internally to provide a sub-enclosure 10D which surrounds and supports the socket mechanism housing frame 20 and which retains pin 24 in place between the two opposite side plates 20A.

An adjustment screw 28 is threaded through a nut 30 which is retained in a cavity in adjustment screw block 20C whose open upper side is enclosed by the top portion of sub-enclosure 10D. The rear of housing frame 20 becomes enclosed by a portion of enclosure plate 10B.

A screwdriver 26 is shown inserted through aperture 16A of front grille 16 and through a guide tube 18B, which is formed integrally with the front panel 18. Screwdriver 26 is shown engaging the head of adjustment screw 28, which can be threadedly tightened against a vertical screw bearing surface on movable jaw part 22 so as to clamp it onto ball 12A against fixed jaw 20B.

Fixed jaw 20B is configured with a downwardly-extending tailpiece 20D which is integrally joined by a pair of integrally-formed end brackets 20E, one at each side of tailpiece 20D, to a crossbar 20F thus forming a loop that extends to the rear into a cavity 10E formed in enclosure plate 10B. This loop, which is accessible from outside the enclosure 10, can be utilized to tether a safety cable such as may be required by earthquake/fire safety regulations in public locations.

The upper portion of the front panel 18 is shaped to form a tweeter horn 18A including a mounting interface for a tweeter driver 32 shown in outline. The lower portion of the front panel 18 is formed with an opening to mount a woofer speaker 34 shown in outline.

Mounting facilities are provided inside enclosure 10 for associated components such as crossover networks. Component 36 is shown mounted to rear panel 10A via internal and external metal plates 36A and 36B which provide heat dissipation and structural strength. Auxiliary components 38 and 40 are shown as representing items for which mounting facilities such as integral threaded bushings may be provided in the molding of the main body of enclosure 10.

The available range of orientation of the enclosure is indicated by dashed outlines 12B' and 12B" showing ball shaft 12B at the limits of the angle formed by ball shaft 12B relative to the enclosure 10. Of course, in an installed situation, shaft 12B remains fixed while the enclosure 10 can be oriented within the range indicated.

The enclosure 10 is seen to consist of two main parts: (1) the main enclosure body including the top, side and bottom panels, back panel 10A including enclosure plate 10B and sub-enclosure 10D, and (2) the front panel 18 including horn 18A and guide tube 18B.

Figure 4:
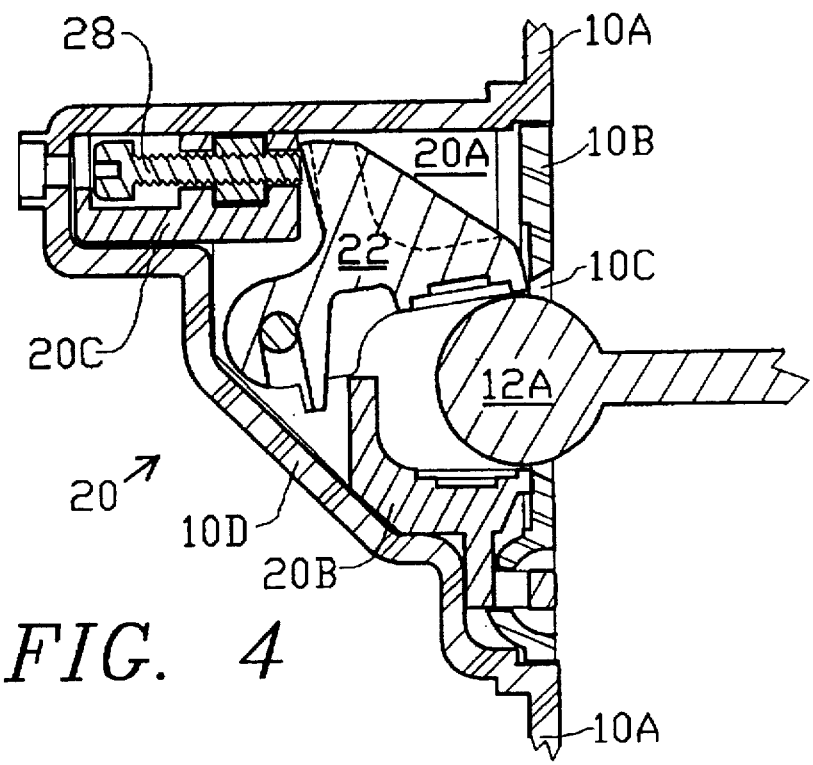
FIG. 4 is a cross-sectional side view of the socket mechanism of FIG. 3 showing the movable jaw retracted and the ball in process of removal.

FIG. 4 is a cross-sectional side view of the socket mechanism in housing frame 20 contained within sub-enclosure 10D of FIG. 3, showing adjustment screw 28 backed off so as to retract movable jaw part 22 sufficiently to release ball 12A and allow it to pass through opening 10C of enclosure plate 10B as shown, as required for initial installation and for removal of the enclosure from the wall-mounted ball assembly.

Figure 5:
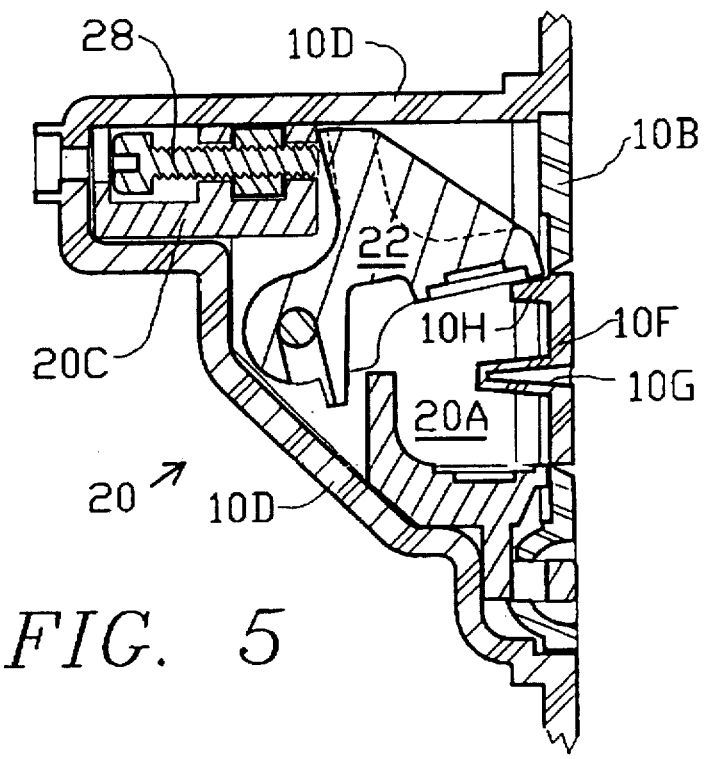
FIG. 5 is a cross-sectional side view of the ball socket mechanism of FIGS. 3 and 4 shown in an initial shipping condition.

FIG. 5 is a cross-sectional side view of the socket mechanism in housing frame 20, similar to FIG. 4 but shown in an initial shipping condition wherein enclosure plate 10B as originally fabricated and supplied includes a round knockout plug 10F fitted with a screwdriver slot 10G. Plug 10F includes a cantilevered shelf 10H extending inwardly upon which movable jaw part 22 is shown resting; in this condition, movable jaw part 22 may be urged downwardly upon shelf 10H by rotating screw 28 for the purpose of securing movable jaw part 22 against looseness and rattling that could otherwise occur during initial shipment and handling.

Plug 10F is initially attached around its circular edge to plate 10B by an intentionally weak joint that can be broken away by leverage of a screwdriver applied in slot 10G so that plug 10F can be removed and discarded at the time of initial installation, leaving exposed the opening 10C (FIGS. 3 and 4) in place of plug 10F.

FIGS. 6A-E are following orthogonal views of the mechanism housing frame 20 shown in FIGS. 3-5: elevational side, front, rear, top and bottom views respectively, showing housing frame 20 and its cross-members: fixed jaw 20B and screw-adjustment block 20C.

FIG. 6A is an elevational view of one of the two symmetrical side plates 20A of mechanism housing frame 20, showing one of the two end brackets 20E extending down from the bottom. Hole 20G is provided for pivot pin (24, FIG. 3).

FIG. 6B, the front view of housing 20, shows crossmember screw-adjustment block 20C defining a U-shaped journal 20H through which adjustment screw (28, FIGS. 3-5) can be accessed by a screwdriver, and shows tailpiece 20D extending downwardly.

FIG. 6C, the rear view of housing 20, shows, at the top, a U-shaped journal 20J in cross-member block 20C for supporting the rear portion of the adjustment screw (28, FIGS. 3-5), and shows crossbar 20F at the bottom.

FIG. 6D, the top view of housing 20 shows the scalloped edge pattern of socket recess 20K formed in the crossmember fixed jaw 20A for ball engagement. Also shown are journals 20H, 20L and 20J formed in crossmember block 20C: the cavity formed between journals 20H and 20L provides space for the head of the screw (28) and cavity between journals 20L and 20J captivates the nut (30).

FIG. 6E, the bottom view of the housing 20, shows the combination of crossbar 20F, two side brackets 20E and tailpiece 20D forming a loop, as shown, that will protrude through the rear of the enclosure, available for safety cable attachment if required.

FIGS. 7A-7E are the following views of the movable jaw part 22 of the ball socket mechanism of FIGS. 3-5: elevational side, front, rear, top and bottom views respectively.

FIG. 7A is an elevational side view of one of two symmetrical sides of movable jaw part 22 configured to have an adjustment screw bearing surface 22A and support gusset 22B.

FIG. 7B is a front view of movable jaw part 22, showing bearing surface 22A.

FIG. 7C is a rear view of movable jaw part 22 showing the support gusset 22B.

FIG. 7D, the top view of movable jaw part 22, shows screw bearing surface 22A and support gusset 22B.

FIG. 7E, the bottom view of movable jaw part 22, shows the scalloped pattern of the socket recess 22C for ball engagement, configured the same as the fixed jaw socket recess (20K, FIG. 6D).

FIG. 7F is a cross-sectional view taken through axis 7F—7F of FIG. 7D.

Referring once again to FIGS. 3–5, typically the mechanism housing frame 20 (which includes two side plates 20A with two cross-members: fixed jaw 20B and adjustment screw block 20C) and the movable jaw part 22 are preferably die cast from aluminum, while the two parts of the main enclosure 10 (front panel 18 including horn 18A and guide tube 18B, and rear enclosure including rear panel 10A, enclosure plate 10B and sub-enclosure 10D) are preferably injection-molded from high impact polystyrene plastic.

Sub-enclosure 10D, shown molded integrally with the enclosure rear panel 10A, could alternatively be made as a separate part and attached to rear panel 10A by known fastening means.

As an option, a coaxial passageway may be provided through ball 12A and shaft 12B (FIG. 3) such that shaft 12B would form a tubular conduit for enclosing speaker connecting wires from behind the wall to the interior of the enclosure, thus providing the aesthetic advantage of concealing the speaker wires.

The adjustment screw and the corresponding tool could be made with a screw-head style different than the regular slot head described above: this could be another conventional style such as Philips, square or hex socket, or it could be a specialized proprietary style to prevent unauthorized adjustment or removal. Alternatively the threaded element of the adjustment screw could be extended by a shaft to a front or side exterior location of the enclosure where a knob or other means could be provided to enable clamping adjustment without need for a tool.

The principle of the invention may be applied to loudspeaker enclosures of various sizes and with different loudspeaker complements, to enclosures other than loudspeaker enclosures and to other objects requiring a similar kind of adjustable pivoted support from a relatively fixed mass.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A lockable swivel mounting assembly, for adjustably supporting an enclosure from a fixed mass, comprising:

a support arm having a first end configured with mounting means for attachment to the fixed mass in a rigid cantilevered manner and having a second end opposite the first end;

a swivel mounting ball rigidly attached to the second end of said support arm;

a ball-clamping mechanism, disposed in a clamp housing, constructed and arranged to receive entry of said ball and to clamp onto said ball in a temporary adjustable manner and in a working fixed manner, comprising (a) a fixed jaw, secured in the clamp housing, configured with a ball-engagement cavity constructed and arranged to lockingly engage a generally circular surface area of said ball, (b) a movable jaw, pivotedly mounted in a working relationship relative to said fixed jaw, configured with a ball-engagement cavity similar to that of said fixed jaw, (c) pivot means, mounting said movable jaw in a non-removable pivoting manner relative to the clamp housing, constructed and arranged to provide releasable engagement of the movable jaw ball-engagement cavity with a circular surface area of said ball substantially opposite an area thereof engaged by the fixed jaw cavity;

(d) clamping adjustment means, constructed and arranged to actuate said jaws in a manner to enable entry, clamping, release and removal of said ball relative to said jaws, comprising: (1) an adjusting screw, having a tool-engagable head end, and (2) anchor means, secured in common with said fixed jaw and the clamp housing, threadedly engaging said adjusting screw, which is thus enabled to actuate said movable jaw;

whereby a user is enabled to actuate said ball-clamping mechanism conveniently by engaging said adjusting screw with a tool inserted through an adjustment access aperture provided in the enclosure and to thus perform installation, orientation adjustment, clamping in place, release and removal of the enclosure in relation to said ball.

2. The lockable swivel mounting assembly as defined in claim 1, wherein said clamping adjustment means further comprises a guide tube constructed and arranged to guide a screw driver tool in a manner to engage the head end of said adjusting screw for rotational adjustment thereof.

3. The lockable swivel mounting assembly as defined in claim 2 wherein;

said adjustment screw is oriented in a horizontal direction;

said jaws are oriented such that fixed jaw cavity faces upwardly and the movable jaw faces downwardly toward the fixed jaw cavity;

said movable jaw is configured with a substantially vertical screw bearing surface constructed and arranged to receive pressure applied from said threaded screw and to transmit the pressure by pivoted translation, via the cavity, onto the ball so as to clamp the ball between said jaws.

4. A swivel-mounted enclosure adjustably supported from a fixed mass, comprising:

a support arm having a first end rigidly attached to the fixed mass by flange means and having a second end extending away from the mass in a cantilevered manner;

a swivel-mounting ball rigidly attached to the second end of said support arm;

a rear panel portion of said enclosure defining, in a central region thereof, a ball-entry opening large enough to provide entry of said ball;

a front panel of said enclosure defining an adjustment access opening;

a ball-clamping mechanism, contained within a rearward region of the enclosure adjacent said rear panel, constructed and arranged to clamp onto said ball and thus support the enclosure from the mass in a predetermined orientation relative thereto; and clamping adjustment means in said ball-clamping mechanism constructed and arranged to enable initial entry, adjustable clamped retention and removal of said ball with adjustment access through the front panel to thus facilitate installation, orientation adjustment, clamping in place, release and removal of the enclosure in relation to said ball without need for rear enclosure access.

5. The swivel-mounted enclosure as defined in claim 4 wherein said rear panel portion of said enclosure is constructed and arranged to provide initially, in the ball-entry opening, a knock-out disk initially attached at an intentionally weak peripheral joint and fitted with a rear-facing cavity by which the knock-out disk can be removed utilizing an ordinary screwdriver so as to deploy the ball-entry opening to receive said ball and thus enable the enclosure to be swivel-mounted in accordance with the present invention.

6. The swivel-mounted enclosure as defined in claim 5 wherein the knock-out disk is configured with an inwardly-extending shelf upon which said movable jaw may be urged by said adjustment screw for purposes of eliminating looseness and rattling during initial shipment.

7. The swivel-mounted enclosure as defined in claim 4 wherein said ball-clamping mechanism comprises:

- a fixed jaw having an upwardly-facing ball-engagement cavity constructed and arranged to lockingly engage a generally circular surface area of said ball;
- a movable jaw, pivotedly mounted in a working relationship relative to said fixed jaw, constructed and arranged to define a ball-engagement cavity downwardly facing the fixed jaw cavity and configured similar thereto;
- pivot means mounting said movable jaw in a non-removable pivoting manner constructed and arranged to provide engagement of the movable jaw cavity with a circular surface area of said ball substantially opposite an area thereof engaged by the fixed jaw cavity and to thusly enable release and removal of said ball therefrom and entry of said ball thereto.

8. The swivel-mounted enclosure as defined in claim 7 wherein said clamping adjustment means comprises:

- screw block means affixed together with said fixed jaw and said enclosure; and
- an adjusting screw oriented in a horizontal direction, threadedly engaged to said screw block means and arranged to act upon a vertical thrust surface, configured in said movable jaw, in a manner to separate said jaws for entry of said ball in response to rotation of said adjusting screw in a first direction and to clamp the jaws together onto said ball in response to rotation thereof in a second direction opposite the first direction;
- whereby a user, engaging and actuating said screw with a tool, via the adjustment access opening, while the enclosure is otherwise supported in a predetermined orientation is enabled to thusly clamp said ball between said jaws and thus render the enclosure firmly supported by the support arm in the predetermined orientation.

9. The swivel-mounted enclosure as defined in claim 4 wherein said enclosure including the front panel and the rear panel portion are made from molded plastic material.

10. The swivel-mounted enclosure as defined in claim 9 wherein said front panel is formed to mount a loudspeaker unit in an operational manner.

11. The swivel-mounted enclosure as defined in claim 10 wherein said front panel further comprises an integrally formed horn with an interface for attaching an associated horn driver unit.

12. The swivel-mounted enclosure as defined in claim 4 wherein said ball-clamping mechanism comprises:

- a housing frame having two opposite side plates integrally joined by a first cross-member comprising a fixed jaw, defining a first ball-engagement cavity, and a second cross-member comprising a screw-adjustment block;
- a movable jaw part, defining a second ball-engagement cavity, disposed within said housing frame and pivotedly attached thereto by a pivot pin, said movable jaw part being constructed and arranged to co-operate with said fixed jaw to clamp said ball;
- a threaded machine nut captively contained in the screw-adjustment block; and
- an adjustment machine screw, threadedly engaging said machine nut;
- said housing frame and movable jaw part being constructed and arranged to enable said adjustment machine screw to be manipulated from a location forward of the rear panel portion of the enclosure so as to act upon said movable jaw part in a manner to actuate clamping of said ball against the fixed jaw and to thus enable mounting installation, orientation adjustment and release of the enclosure relative to said ball and support arm.

13. The swivel-mounted enclosure as defined in claim 4 wherein said swivel-mounted enclosure is constructed and arranged to operate as a loudspeaker enclosure and further comprises at least one loudspeaker mounted on the front panel in an operational manner.

14. The swivel-mounted enclosure as defined in claim 4 wherein the rear panel portion of said enclosure comprises an enclosure plate forming a central subpanel portion thereof, including the ball-entry opening.

* * * * *